United States Patent

[11] 3,629,683

| | | |
|---|---|---|
| [72] | Inventor | Joe A. Nuckolls<br>Hendersonville, N.C. |
| [21] | Appl. No. | 777,677 |
| [22] | Filed | Nov. 21, 1968 |
| [45] | Patented | Dec. 21, 1971 |
| [73] | Assignee | General Electric Company |

[54] HIGH-FREQUENCY LAMP OPERATING CIRCUIT
12 Claims, 5 Drawing Figs.

[52] U.S. Cl........................................ 321/2,
315/241, 315/242, 321/44
[51] Int. Cl....................................... H02m 3/22
[50] Field of Search............................ 315/241,
242; 321/2, 43, 44, 46; 328/67

[56] References Cited
UNITED STATES PATENTS

| 2,676,295 | 4/1954 | Douma........................ | 321/2 |
|---|---|---|---|
| 2,693,532 | 11/1954 | Krienen....................... | 328/67 |
| 3,176,158 | 3/1965 | Guignard..................... | 328/67 X |
| 3,273,018 | 9/1966 | Goldberg..................... | 321/45 DT |
| 3,308,342 | 3/1967 | Coradeschi.................. | 315/242 |
| 3,353,062 | 11/1967 | Nuckolls..................... | 315/242 X |

FOREIGN PATENTS
633,453  12/1949  Great Britain................  315/241

OTHER REFERENCES
" Triac control for AC Power" General Electric Application Note, Howell, E. K., p. 4, May 1964.

*Primary Examiner*—William M. Shoop, Jr.
*Attorneys*—Sidney Greenberg, J. Wesley Haubner, Frank L. Neuhauser, Oscar B. Waddell and Melvin M. Goldenberg ABSTRACT: Circuit operating from a low-voltage current source for applying high-voltage, high-frequency alternating current to a load such as a gaseous discharge lamp connected across the source includes a charging capacitor and a first induction coil connected across the source and forming a first resonant circuit, a second induction coil and a controlled rectifier switch connected in series across the capacitor forming a second resonant circuit when the controlled rectifier switch is closed, and triggering means connected to the source for operating the controlled rectifier switch in accordance with a predetermined rate, the second resonant circuit operating to close the controlled rectifier switch, and the first resonant circuit operating when the switch is opened to raise the voltage and apply it to the load in high-frequency pulses for starting and operating the same.

Inventor,
Joe A. Nuckolls,
by Sidney Greenberg
His Attorney.

Inventor,
Joe A. Nuckolls,
by Sidney Greenberg
His Attorney.

Inventor,
Joe A. Nuckolls,
by Sidney Greenberg
His Attorney.

HIGH-FREQUENCY LAMP OPERATING CIRCUIT

The present invention relates to high-frequency operating circuits for loads such as gaseous discharge lamps.

It is an object of the invention to provide a circuit arrangement for applying a high-frequency voltage to load devices, especially gaseous discharge lamps, from either alternating or direct current low voltage sources to effect load operation and control.

It is another object of the invention to provide circuit arrangement of the above type which is readily produced at low cost, is reliable in operation, versatile in application, and capable of control over a wide range of conditions to obtain desired operating results.

It is still another object of the invention to provide a circuit arrangement of the above type embodying improved load starting means.

A further object of the invention is to provide a circuit arrangement of the above type in which protection is afforded components thereof against adverse operating conditions and having regulating means to provide for stable operation.

Other objects and advantages will become apparent from the following description and the appended claims.

With the above objects, in view, the present invention relates to a circuit for starting and controlling the operation of a load comprising, in combination, a source of electrical current, a first induction device in series with the source of electrical current, a charging capacitor connected across the current source at the output of the first induction device, controlled switch means and a second induction device in series with the first induction device and across the capacitor, load means such as a gaseous discharge lamp connected to the electrical source and across the capacitor, and triggering means connected to the electrical source for operating the controlled switch means at predetermined intervals, the capacitor forming with the second induction device a first resonant circuit when the controlled switch means is closed for reversing the voltage across the capacitor for opening the controlled switch means, and forming with the first induction device a second resonant circuit when the controlled switch means is opened for transferring energy stored in the first induction device to the capacitor to again reverse and raise the voltage across the capacitor for applying to the load means.

The invention will be better understood from the following description and the accompanying drawings, in which.

Figure 1:
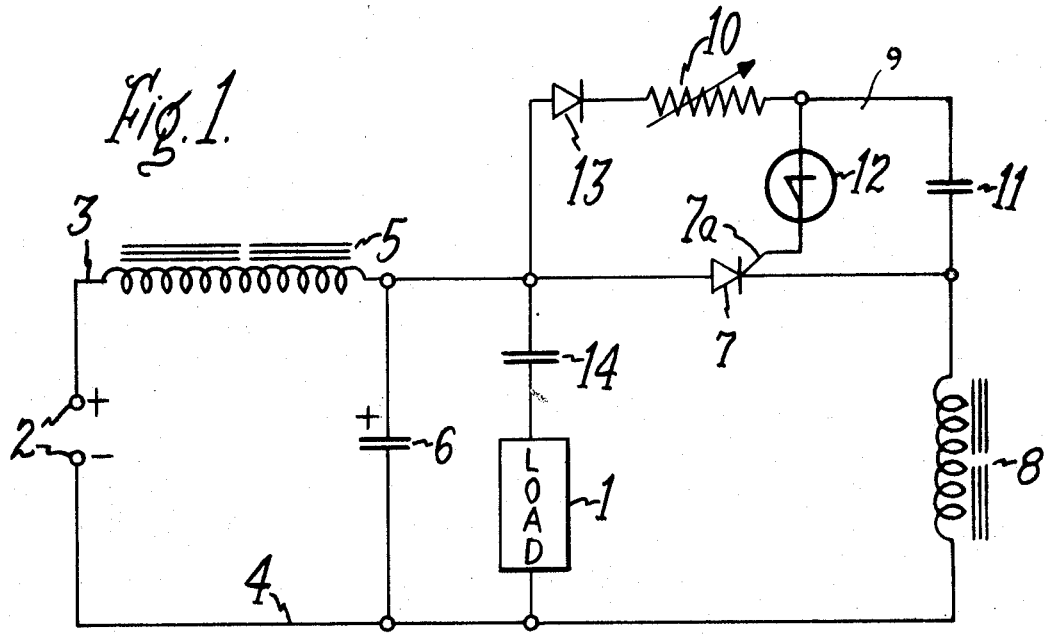
FIG. 1 is a circuit diagram of an embodiment of the present invention which operates from a direct current source.

Referring now to the drawings, and particularly to FIG. 1, there is shown a circuit diagram illustrating an embodiment of the high-frequency control circuit of the invention. As shown, the circuit for starting and operating gaseous discharge lamp comprises supply conductors 3 and 4 connecting the lamp to terminals 2 of a source of electrical current, such as a low-voltage direct current supply, e.g., a 12-volt battery, or a rectified alternating-current supply. Connected in series with lamp 1 and the electrical supply is an induction coil 5 such as a choke coil, and connected at the output of the latter coil across the electrical supply terminals 2 and lamp 1 is charging capacitor 6. A controlled switch such as a silicon controlled rectifier (SCR) 7 is connected to choke coil 5 and supply terminals 2 in series with another choke coil 8 of smaller magnitude than coil 5, this branch being connected across charging capacitor 6 and the load branch as shown.

Connected across SCR 7 is an actuating circuit 9 for triggering SCR 7 into conductive condition comprising variable resistor 10 and capacitor 11, with a voltage-sensitive switch such as a Shockley diode 12 connected to control electrode 7a of SCR 7 and in series discharge relation with capacitor 11. Diode 13 is connected in series with resistor 10 and capacitor 11 in the actuating circuit.

Capacitor 14 may, if desired, be connected in series with lamp load 1 as shown to compensate for load impedance changes, but this capacitor is not an essential element of the circuit.

In the operation of the disclosed circuit, charging capacitor 6 is charged to the voltage of the supply source, e.g., 12 volts, and is polarized as shown. Capacitor 11 in actuating circuit 9 is also charged at a rate determined by the RC time constant afforded by the combination of variable resistor 10 and capacitor 11. When the potential on capacitor 11 reaches the breakdown voltage of Shockley diode 12, capacitor 11 discharges through the loop in including SCR control electrode 7a and turns on SCR 7. Upon firing of SCR 7, capacitor 6 begins to discharge through SCR 7 and choke coil 8, and forms with the latter a high-frequency resonant discharge loop. At the same time, the SCR turn-on provides a current path through choke coil 5 from the supply, hence a current buildup occurs through coil 5, storing energy in the latter's magnetic field. As the voltage across capacitor 6 drops, the energy in the field of coil 8, which has also been built up by the sum of the currents through induction coil 5 and the discharge of capacitor 6, is returned to the circuit, forcing a voltage reversal to occur across capacitor 6 and thus causing SCR 7 to be reverse biased for a period of time sufficient to turn it off. The energy in the field of coil 5 provides charging current which now flows to capacitor 6, raising its voltage from the negative state to drive it on to a high-voltage positive state, that is, polarized as shown in FIG. 1. SCR 7 is then refired by the same process as above described. With higher voltage available across capacitor 6, the next cycle gives rise to an even higher voltage oscillation. This continues until some equilibrium potential is achieved as a function of the total circuit losses including the load. From a 12-volt DC supply, a typical alternating-current oscillation magnitude across capacitor 6 would be about 250 volts. Therefore, a low-voltage supply can be utilized and operate gaseous discharge lamps or electroluminescent lamps requiring 200 volts AC for their maintenance. The power delivered to this load is readily controlled by adjustment of the actuating (trigger) circuit 9 which provides for varying the delay in refiring of the SCR which effectively controls the power pulse reoccurrence frequency. Thus, there is developed across capacitor 6 a high-frequency high AC voltage whose oscillation reoccurrence rate is controlled by the frequency of the SCR turn on.

As indicated, induction coil 5 has a larger inductance than coil 8, since otherwise the instantaneous reactance of coil 5 would not be sufficient to provide adequate decoupling of the discharge loop comprising capacitor 6 and coil to allow this loop to perform its complete cycle of oscillation and cause the described high-voltage reversal across capacitor 6 to force the turned-on SCR to be commutated. The magnitude of the inductance of coil 5 should be at least four times that of coil 8, and in a usual case will be about 50 to 200 times larger. Capacitor 14 in series with the load provides for stable operation of the load even with changes in load impedance over a wide range.

The magnitude of the various circuit components may be selected and altered as desired to control both the frequency and the power to be delivered to the load circuit. By making the inductance of coil 5 very large, the voltage appearing across capacitor 6 will resemble a sawtooth wave train. By reducing the magnitude of coil 5 to a minimal amount, this wave form will resemble a nearly 100 percent amplitude-modulated 120 cycle carrier when the source is a 60-cycle fully rectified supply. Hence, a lamp load may be switched at a high-frequency rate continuously or allowed to follow the low-frequency power envelope in which the index of modulation can be controlled.

Numerous modifications may be made in the FIG. 1 circuit for obtaining desired results. For example, SCR 7 may be replaced by a high frequency symmetrical switch such as triac, which is an alternating-current semiconductor controlled switch having a single control electrode, which when gated, causes the switch to conduct current in the direction as indicated by the forward bias condition of the semiconductor. Such a modification is shown in the FIG. 2 circuit, in which triac 15 having control electrode 15a replaces SCR 7 in the FIG. 1 circuit. Also, in this embodiment a symmetrical voltage-sensitive switch 16 such as a neon glow lamp connected to control electrode 15a replaces the asymmetrical Shockley diode 12 of FIG. 1. In the modified arrangement, both halves of the 60-cycle AC source can be used without utilizing a bridge rectifier in the circuit.

Figure 3:
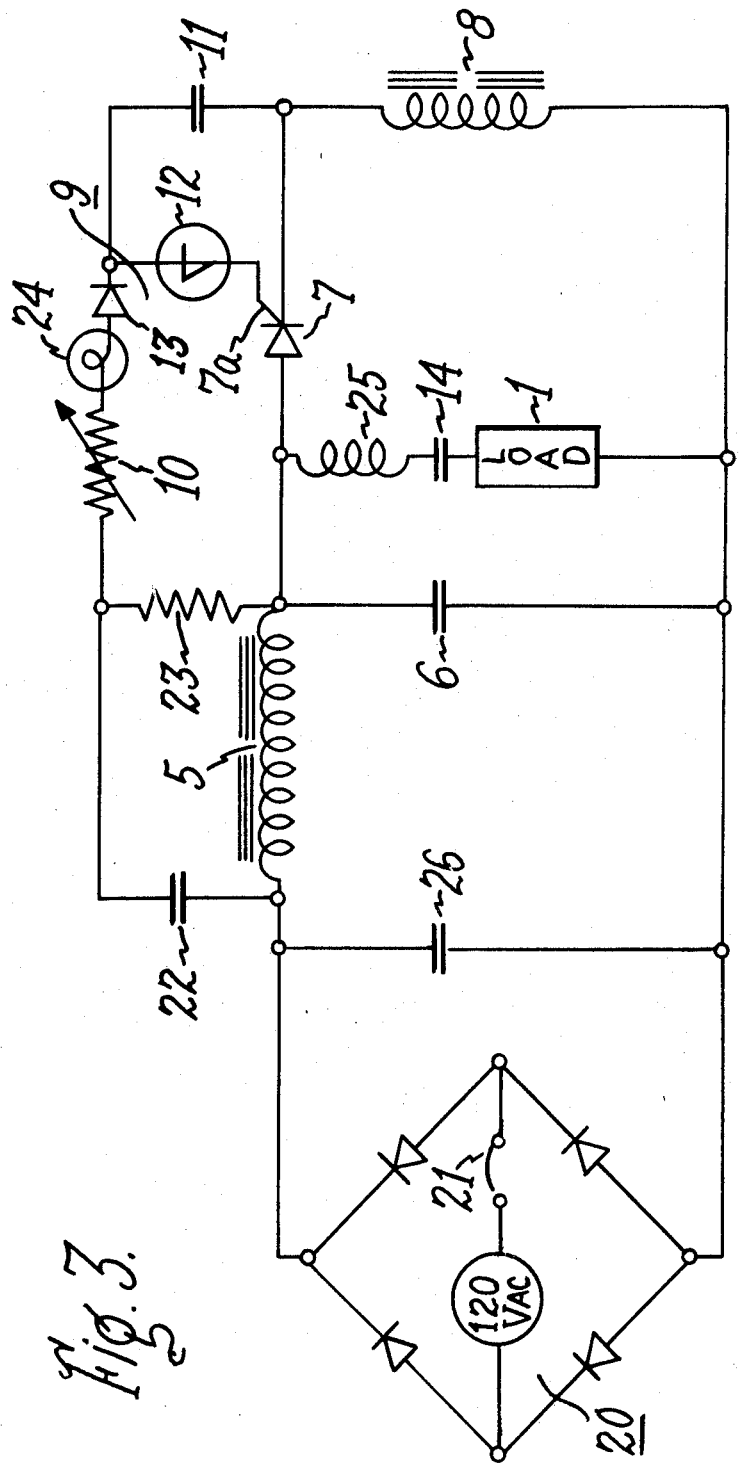
FIG. 3 shows a modification of the circuit of the invention operating from a rectified alternating-current source.

FIG. 3 shows another modification of the circuit in which is incorporated a bridge full-wave rectifier 20 for operating the load from an AC source. A current-sensitive circuit breaker 21, which may be of self-resetting type, is arranged in series with he supply source and serves to open the circuit to allow commutation of SCR switch 7 if for any reason it should fail in the conductive mode. Across choke coil 5 is placed an integrating network comprising capacitor 22 and resistor 23 in series and serving to ensure load current feedback into the actuating circuit 9. A small filament lamp 24 is arranged in series with resistor 10 in the actuating circuit to provide an increase in resistance to limit the increase in triggering rate between starting and fully operating voltage conditions. Any suitable thermally responsive resistor may be used for this purpose if desired.

Connected in series with lamp 1 is a high-frequency ballast comprising inductor 25 and capacitor 14. An RF bypass and filter capacitor 26 is advantageously connected across the supply to stiffen the latter voltage and to bypass any radiofrequency which may be capacitatively coupled through choke coil 5.

Figure 2:
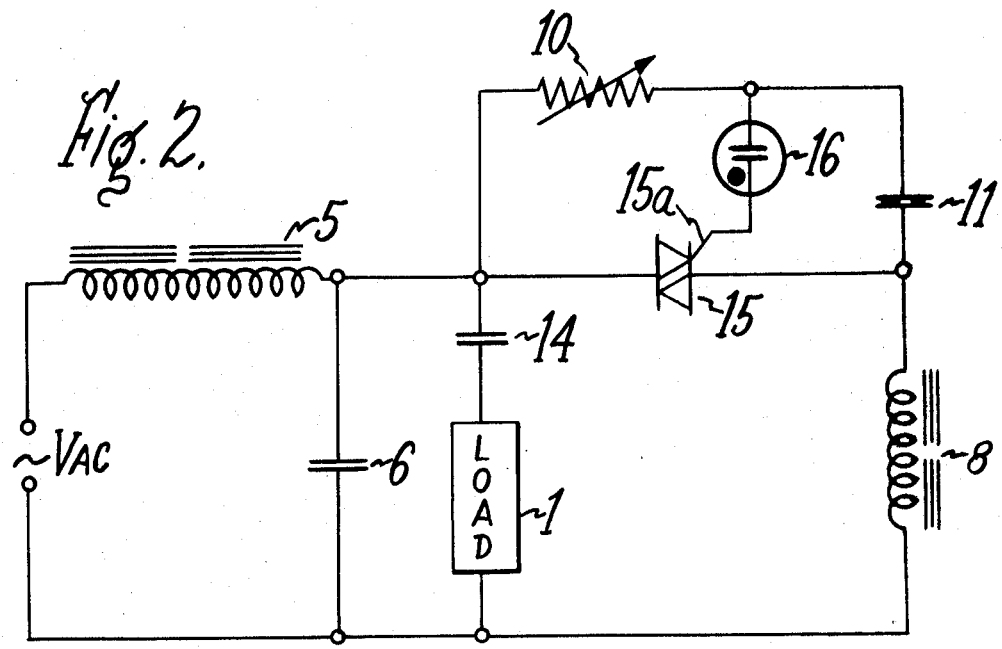
FIG. 2 shows a modification of the FIG. 1 circuit adapted to operate from an alternating-current source and having a different controlled switch.
Figure 4:
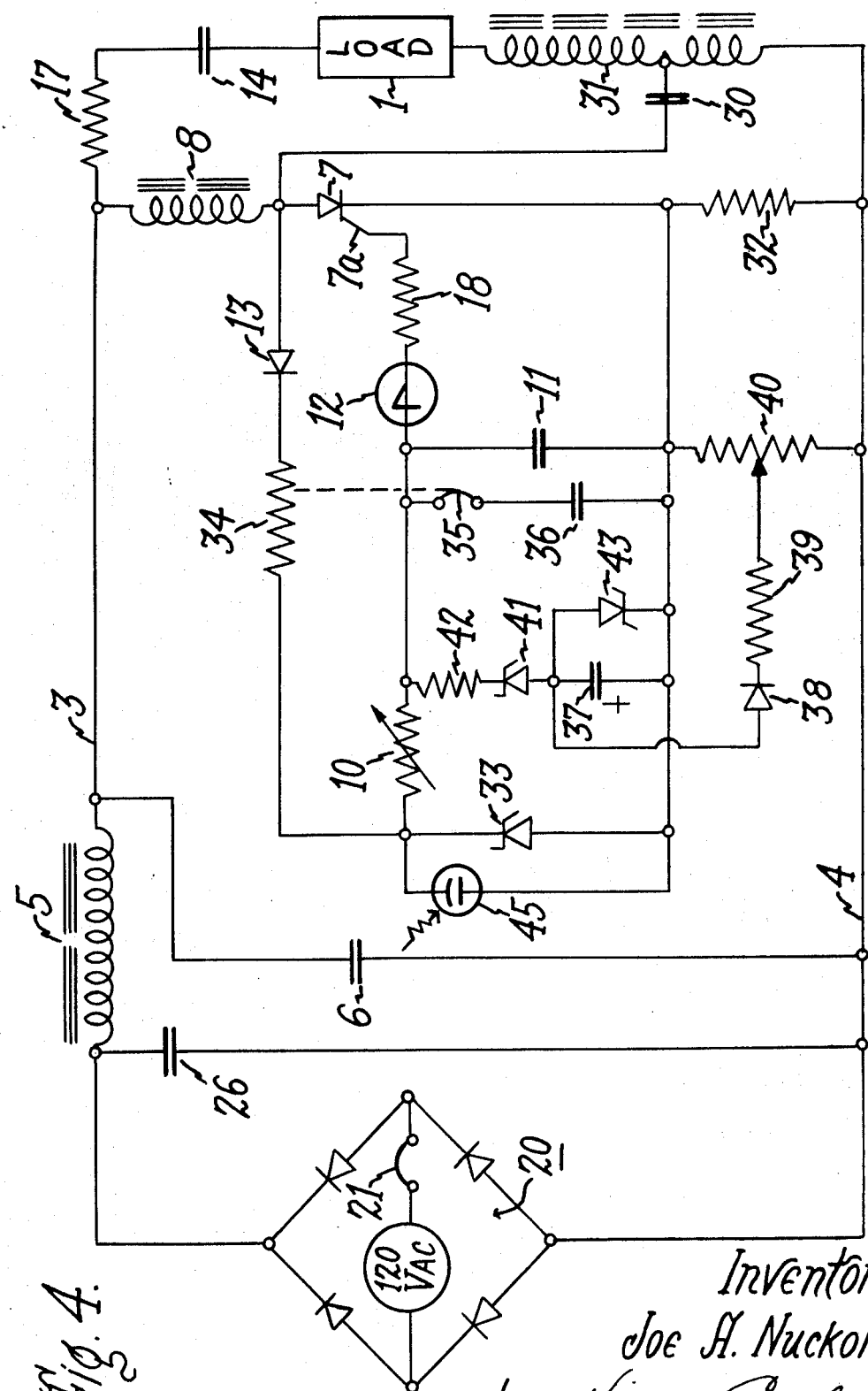
FIG. 4 is a circuit diagram of an embodiment of the invention including a modified starting circuit.

The circuit depicted in FIG. 4, in which components corresponding to those shown in FIGS. 1-3 have the same numerals, includes various modifications to the FIG. 3 circuit for compensating for variations in the supply and load voltage conditions, to provide uniform load power, to ensure optimum starting conditions, and other improvements. The circuit includes, for example, a high-voltage pulse generating loop for facilitating the ionization and starting of lamp 1 which comprises capacitor 30 connected at one side to a tap on ballast reactor 31 and at the other side between inductor 8 and SCR 7. This starting loop which includes SCR 7 and the primary of reactor 31 functions by the charge on capacitor 30 being released upon firing of SCR 7 and thus being applied to the primary of reactor 31, the latter acting as an autotransformer to step up the voltage to kilovolt range for starting of lamp 1.

Resistor 32 arranged in series with SCR 7 and in series discharge relation with load 1 and capacitor 14 serves to generate a feedback signal to effect load regulation as a function of both load and input variations. In addition to this current, a current also flows in discharge relation from capacitor 6 through resistor 32 contributing to the feedback which provides feedback information as to the voltage buildup across capacitor 6. The triggering circuit, which includes variable resistor 10, charging capacitor 11, Shockley diode 12 and SCR 7 as previously described, is modified by incorporating a voltage limiting device such as Zener diode 33 across capacitor 11 to provide a constant trigger circuit driving potential, even though the voltage swing across SCR 7 varies widely between starting, no-load and full load conditions.

A starting mechanism is also added in the FIG. 4 circuit to provide reduced pulsing frequency, and thus lower load current, during the starting interval. This mechanism includes heating resistor 34 arranged in series with the resistor 10 and diode 13 of the trigger circuit and in thermal proximity to a normally closed bimetal heat-responsive switch 35 which, in series with capacitor 36, is arranged in parallel to charging capacitor 11. Switch 35 opens when resistor 34 becomes heated to a predetermined thermal level. While switch 35 remains closed, the capacitance in the RG time constant trigger circuit is the combined capacitance of capacitor 11 and capacitor 36, and the triggering frequency is at a relatively low rate. When switch 35 opens, the trigger capacitance is only that of capacitor 11 and therefore less, hence the frequency of trigger circuit operation increases. Thus, during the initial starting interval the frequency of pulses applied to the load is reduced as compared to the frequency in the subsequent operating period, thereby limiting the lamp-starting current, circuit losses, and other unfavorable effects.

A feedback arrangement incorporated in the FIG. 4 circuit for regulating the lamp operation while compensating for input voltage variations comprises storage capacitor 37 connected across charging capacitor 11, and diode 38 and resistor 39 in series therewith connected to potentiometer 40, which is arranged in series with capacitor 11 and connected to supply conductor 4. In the operation of this feedback circuit, the repetition rate and peak of the SCR current pulses are integrated and stored as a DC voltage on capacitor 37, and the latter operates to vary the normal RC delay of the trigger circuit by permitting current to leak away from charging capacitor 11 and to that extent reducing the frequency of the trigger-actuated pulses. Thus, if SCR current peaks are high with a high pulse frequency rate, a higher opposing voltage is built up across feedback capacitor 37 with polarity as shown, thereby forcing a decrease in the SCR triggering rate and the frequency of pulses applied to the load. By moving the arrow of potentiometer 40 down in the arrangement shown in FIG. 4, the amount of feedback is increased, thereby reducing the amount of wattage in the load and forcing the SCR frequency to be reduced. This feedback mechanism thus automatically compensates for input voltage variations and load changes.

Arranged in series with feedback capacitor 37 are Zener diode 41 and resistor 42 which serve to linearize the feedback response. Another Zener diode 43 is connected across feedback capacitor 37 for limiting the amount of feedback voltage that can be developed, thus preventing complete turnoff of SCR 7 during the high feedback periods, thereby providing improved stability.

For the purpose of controlling the operation of the triggering circuit, and hence the lamp load, in response to ambient light level conditions, a photoconductive device 45 such as a cadmium sulfide cell is connected across Zener diode 33 and exposed to the ambient light. With such an arrangement, the photocell 45 will conduct current in the day time and prevent buildup of voltage in charging capacitor 11, thus turning off the lamp. In the dark, photocell 45 is nonconductive and thus permits normal operation of the triggering circuit for turning the lamp 1 on.

Typical values of components shown in the FIG. 4 circuit are as follows:

| | |
|---|---|
| Inductor 5 | 25 millihenries |
| Inductor 8 | 125 microhenries |
| Capacitor 11 | 0.018 mfd. |
| Capacitor 26 | 1 mfd. |
| Capacitor 6 | 0.175 mfd. |
| Resistor 17 | 1 ohm. |
| Capacitor 14 | 0.1 mfd. |
| Resistor 34 | 6 K ohms |
| Resistor 10 | 2.7 K ohms |
| Resistor 42 | 1.8 K ohms |
| Resistor 39 | 2 ohms |
| Resistor 40 | 10 ohms |
| Resistor 32 | 0.36 ohms |
| Capacitor 37 | 50 mfd. |
| Capacitor 36 | 0.01 mfd. |
| Capacitor 30 | 0.002 mfd. |
| Resistor 18 | 22 ohms |
| Zener 33 | 36 volts |
| Zener 41 | 22 volts |
| Shockley diode 12 | 20 volts |
| SCR 7 | C-141D |

Figure 5:
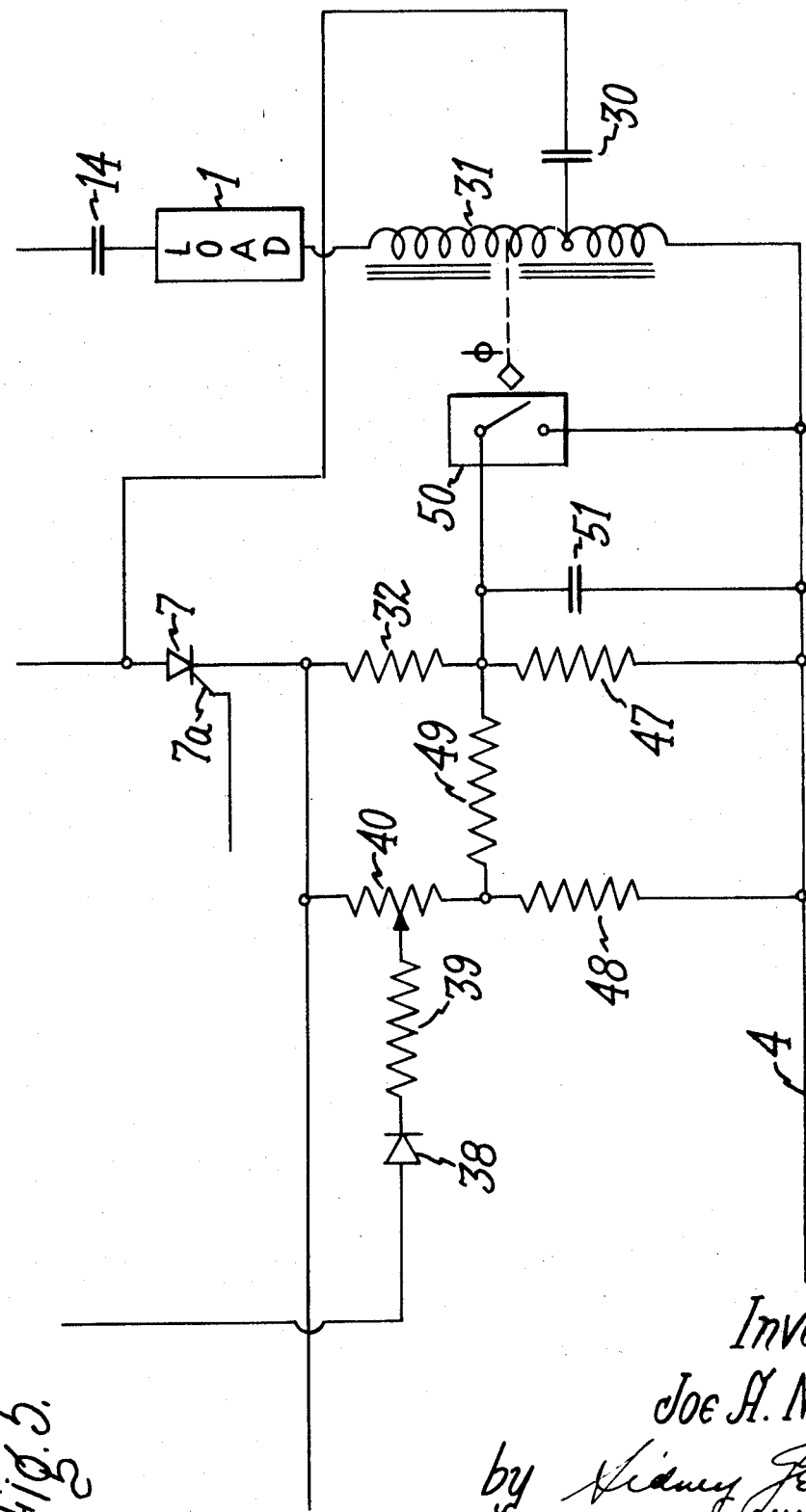
FIG. 5 shows a modification of the FIG. 4 circuit incorporating an arrangement for protecting the switching circuit.

FIG. 5 shows a modification of the FIG. 4 circuit which provides a load-current-sensing circuit for preventing high peak SCR switching currents and voltages in the event the load circuit does not draw current for any reason. This embodiment includes a resistor 47 or other current limiting impedance in series with SCR 7 and a voltage divider network including resistors 48 and 49 connected as shown to potentiometer 40 in parallel with resistor 47. A normally open bimetal thermal switch 50 is connected across limiting resistor 47 and arranged in proximity to ballast reactor 31 so as to be responsive to the heat generated in the bimetal switch by the magnetic flux of reactor 31 when lamp 1 is conducting current. Resistor 47 (or equivalent impedance means) serves to limit the peak current through SCR 7 under no-load conditions and also limits the peak current through lamp 1 immediately after the lamp starts nd while in the low-impedance state.

Resistor 32 serves as the normal feedback shunt during operation of the load. During the starting interval when switch 50 is open, resistor 47 also becomes a part of the feedback shunt along with the voltage divider network 48, 49, so as to provide greater feedback during the starting operation. Capacitor 51 connected across resistor 47 is a high-frequency bypass capacitor which, in the arrangement shown, serves to ensure that the high-frequency starting voltage is generated in the high-frequency high-voltage discharge loop described previously.

In the operation of the FIG. 5 embodiment, resistor 47 limits the peak current passing through SCR 7 prior to starting of lamp 1, and when load current is drawn, magnetic flux is set up in ballast reactor 31 and generates heat in the bimetal disc of normally open thermal switch 50. After a delay during which the bimetal disc becomes heated, switch 50 snaps closed, thus shorting out the limiting resistor 47 and permitting the normal feedback and regulation function to operate. The described feedback modification provides switching circuit protection and facilitates load starting with an automatic transfer to a highly efficient, steady state mode of operation. The time delay of the starting period can be adjusted by suitable spacing between the bimetal switch 50 and reactor 31, or by selection of the switch actuating temperature, limiting resistance magnitudes, SCR switching frequency, or by other means.

The following are typical values of components depicted in the FIG. 5 embodiment:

| | |
|---|---|
| Resistor 40 | 10 ohms |
| Resistor 48 | 100 ohms |
| Resistor 49 | 2.4 ohms |
| Resistor 32 | 0.36 ohms |
| Resistor 47 | 2 ohms |
| Reactor 31 | 125 microhenries |
| Capacitor 30 | 0.002 mfd. |
| Capacitor 51 | 0.001 mfd. |

There is thus provided in accordance with the invention a circuit arrangement which is capable of applying, in an economical manner, a high-frequency voltage to discharge lamps and other types of loads from either AC or DC to effect load control from a low-voltage source.

While the present invention has been described with reference to particular embodiments thereof, it will be understood that numerous modifications may be made by those skilled in the art without actually departing from the scope of the invention. Therefore, the appended claims are intended to recover all such equivalent variations as come within the true spirit and scope of the invention.

What I claim as new and desire to secure by Letters Patent of the United States is:

1. A circuit for starting and controlling the operation of a load comprising, in combination, a source of electrical current, a first induction device in series with said source of electrical current, a charging capacitor connected across said current source at the output of said first induction device, controlled switch means and a second induction device in series with said first induction device and across said capacitor, load means connected to said electrical source and across said capacitor, and triggering means connected to said charging capacitor for operating said controlled switch means at predetermined intervals in synchronism with the voltage of said charging capacitor, said capacitor forming with said second induction device a first resonant circuit when said controlled switch means is closed for reversing the voltage across said capacitor for opening said controlled switch means, and forming with said first induction device a second resonant circuit when said controlled switch means is opened for transferring energy stored in said first induction device to said capacitor to again reverse and raise the voltage across said capacitor for applying to said load means, and integrating network means connected between said first induction device and said triggering means for providing stability to the load current.

2. A circuit for starting and controlling the operation of a load comprising, in combination, a source of electrical current, a first induction device in series with said source of electrical current, a charging capacitor connected across said current source at the output of said first induction device controlled switch means and a second induction device in series with said first induction device and across said capacitor, load means connected to said electrical source and across said capacitor, and triggering means connected to said charging capacitor for operating said controlled switch means at predetermined intervals in synchronism with the voltage of said charging capacitor, said capacitor forming with said second induction device a first resonant circuit when said controlled switch means is closed for reversing the voltage across said capacitor for opening said controlled switch means, and forming with said first induction device a second resonant circuit when said controlled switch means is opened for transferring energy stored in said first induction device to said capacitor to again reverse and raise the voltage across said capacitor for applying to said load means, including a transformer having a primary and a secondary and connected in series with said load means, a second capacitor connected to the primary of said transformer and to said controlled switch means and forming therewith a high-frequency discharge loop for discharging energy from said capacitor through said transformer primary upon closing of said controlled switch means, said transformer stepping up the voltage on said primary for applying high-frequency high-voltage pulses to said load means for starting the same.

3. A circuit for starting and controlling the operation of a load comprising, in combination, a source of electrical current, a first induction device in series with said source of electrical current, a charging capacitor connected across said current source at the output of said first induction device, controlled switch means and a second induction device in series with said first induction device and across said capacitor, load means connected to said electrical source and across said capacitor, and triggering means connected to said charging capacitor for operating said controlled switch means at predetermined intervals in synchronism with the voltage of said charging capacitor, said capacitor forming with said second induction device a first resonant circuit when said controlled switch means is closed for reversing the voltage across said capacitor for opening said controlled switch means, and forming with said first induction device a second resonant circuit when said controlled switch means is opened for transferring energy stored in said first induction device to said capacitor to again reverse and raise the voltage across said capacitor for applying to said load means, and feedback means for compensating for variations in supply current and load current comprising impedance means in series with said controlled switch means and across said load means.

4. A circuit for starting and controlling the operation of a load comprising, in combination, a source of electrical current, a first induction device in series with said source of electrical current, a charging capacitor connected across said current source at the output of said first induction device, controlled switch means and a second induction device in series with said first induction device and across said capacitor, load means connected to said electrical source end across said capacitor, and triggering means connected to said charging capacitor for operating said controlled switch means at predetermined intervals in synchronism with the voltage of said charging capacitor, said capacitor forming with said second induction device a first resonant circuit when said controlled switch means is closed for reversing the voltage across said capacitor for opening said controlled switch means, and forming with said first induction device a second resonant circuit when said controlled switch means is opened for transferring energy stored in said first induction device to said capacitor to again reverse and raise the voltage across said capacitor for applying to said load means, and voltage-limiting means connected across said charging capacitor for providing a constant driving potential for said triggering means.

5. A circuit for starting and controlling the operation of a load comprising, in combination, A source of electrical current, a first induction device in series with said source of electrical current, a charging capacitor connected across said current source at the output of said first induction device, controlled switch means and a second induction device in series with said first induction device and across said capacitor, load means connected to said electrical source and across said capacitor, and triggering means connected to said charging capacitor for operating said controlled switch means at predetermined intervals in synchronism with the voltage of said charging capacitor, said capacitor forming with said second induction device a first resonant circuit when said controlled switch means is closed for reversing the voltage across said capacitor for opening said controlled switch means, and forming with said first induction device a second resonant circuit when said controlled switch means is opened for transferring energy stored in said first induction device to said capacitor to again reverse and raise the voltage across said capacitor for applying to said load means, including control means for reducing the starting pulse frequency applied to said load means.

6. A circuit for starting and controlling the operation of a load comprising, in combination, a source of electrical current, a first induction device in series with said source of electrical current, a charging capacitor connected across said current source at the output of said first induction device, controlled switch means and a second induction device in series with said first induction n device and across said capacitor, load means connected to said electrical source and across said capacitor, and triggering means connected to said charging capacitor for operating said controlled switch means at predetermined intervals in synchronism with the voltage of said charging capacitor, said capacitor forming with said conduction induction device a first resonant circuit when said controlled switch means is closed for reversing the voltage across said capacitor for opening said controlled switch means, and forming with said first induction device a second resonant circuit when said controlled switch means is opened for transferring energy stored in said first induction device to said capacitor to again reverse and raise the voltage across said capacitor for applying to said load means, said triggering means comprising a capacitance and resistance connected together in series, and voltage-sensitive switch means connected to said controlled switch means and across said capacitance, and control means for reducing the starting pulse frequency applied to said load means, said control means comprising an auxiliary capacitance and a normally closed thermal switch arranged in series across said first-mentioned capacitance, and heating impedance means connected in circuit with said triggering means and thermally coupled to said thermal switch for opening the same upon reaching a predetermined heat level during the operation of said triggering means, whereby the triggering frequency is reduced during the starting interval.

7. A circuit for starting and controlling the operation of a load comprising, in combination, a source of electrical current, a first induction device in series with said source of electrical current, a charging capacitor connected across said current source at the output of said first induction device, controlled switch means and a second induction device in series with said first induction device and across said capacitor, load means connected to said electrical source and across said capacitor, and triggering means connected to said charging capacitor for operating said controlled switch means at predetermined intervals in synchronism with the voltage of said charging capacitor, said capacitor forming with said second induction device a first resonant circuit when said controlled switch means is closed for reversing the voltage across said capacitor for opening said controlled switch means, and forming with said first induction device a second resonant circuit when said controlled switch means is opened for transferring energy stored in said first induction device to said capacitor to again reverse and raise the voltage across said capacitor for applying to said load means, said triggering means comprising a capacitance and resistance connected together in series, and voltage sensitive switch means connected to said controlled switch means and across said capacitance, and feedback means for regulating operation of said load means while compensating for supply voltage variations comprising variable resistor means connected to said current source in series with said capacitance, and a storage capacitor connected across said capacitance and connected at its output side to said variable resistor means.

8. A circuit as defined in claim 7, including means connected in series with said storage capacitor for providing a linear feedback voltage output.

9. A circuit as defined in claim 7, including voltage-limiting means connected across said storage capacitor for limiting feedback voltage across the same.

10. A circuit for starting and controlling the operation of a load comprising, in combination, a source of electrical current, a first induction device in series with said source of electrical current, a charging capacitor connected across said current source at the output of said first induction device, controlled switch means and a second induction device in series with said first induction device and across said capacitor, load means connected to said electrical source and across said capacitor, and triggering means connected to said charging capacitor for operating said controlled switch means at predetermined intervals in synchronism with the voltage of said charging capacitor, said capacitor forming with said second induction device a first resonant circuit when said controlled switch means is closed for reversing the voltage across said capacitor for opening said controlled switch means, and forming with said first induction device a second resonant circuit when said controlled switch means is opened for transferring energy stored in said first induction device to said capacitor to again reverse and raise the voltage across said capacitor for applying to said load means, including transformer means in series with said load means, current-limiting impedance means in series with said controlled switch means and across said load means, and load-current-sensing means for protecting said controlled switch means in the absence of load current, said sensing means comprising normally open thermal switch means connected in series with said controlled switch means and across said current limiting impedance means and arranged in the path of magnetic flux generated by said transformer means during passage of load current therethrough, said thermal switch means closing when heated by said magnetic flux and providing a bypass around said current limiting impedance means during operation of said load means.

11. A circuit for starting and controlling the operation of a gaseous discharge lamp load comprising, in combination, a source of electrical current, a first induction device in series wit with said source of electrical current, a charging capacitor connected across said current source at the output of said first induction device, load means comprising a gaseous discharge lamp connected to said electrical source and across said charging capacitor, controlled switch means and a second induction device connected in series with said first induction device across said charging capacitor and across said load means, and triggering means connected to said charging capacitor for operating said controlled switch means at predetermined intervals in synchronism with the voltage of said charging capacitor, said with said capacitor forming with said second induction device a first resonant circuit when said controlled switch means is closed for reversing the voltage across said charging capacitor for opening said controlled switch means, and forming with said first induction device a second resonant circuit when said controlled switch means is opened for transferring energy stored in said first induction device to said charging capacitor to again reverse and raise the voltage across said charging capacitor for applying to said load means, said first induction device having a larger inductance than said second induction device, said triggering means comprising an RC network comprising a capacitance and a resistance in series connected across said controlled switch means, and voltage-sensitive switch means connected to said controlled switch means and across said capacitance.

12. A circuit as defined in claim 11, said source of electrical current being a source of alternating current, said controlled switch means being a high-frequency triac, and said voltage sensitive switch being a bidirectional conducting switch.

* * * * *

UNITED STATES PATENT OFFICE
CERTIFICATE OF CORRECTION

Patent No. 3,629,683      Dated December 21, 1971

Inventor(s) Joe A. Nuckolls

It is certified that error appears in the above-identified patent and that said Letters Patent are hereby corrected as shown below:

Col. 1, line 61 - After "lamp" insert - 1 -

Col. 2, line 18 - After "loop" delete "in"

Col. 2, line 55 - After "coil" insert - 8 -

Col. 3, line 3  - Before "triac" insert - a -

Col. 3, line 21 - "he" should be - the -

Col. 5, line 63 - "recover" should be - cover -

Col. 7, line 45 - Delete "n"

Col. 7, line 51 + 52 - "conduction" should be - second -

Signed and sealed this 6th day of June 1972.

(SEAL)
Attest:

EDWARD M. FLETCHER, JR.
Attesting Officer

ROBERT GOTTSCHALK
Commissioner of Patents